United States Patent
Yang (10) Patent No.: US 7,973,834 B2
(45) Date of Patent: Jul. 5, 2011

(54) ELECTRO-OPTICAL FOVEATED IMAGING AND TRACKING SYSTEM

(76) Inventor: Jianwen Yang, Miami, FL (US)

( * ) Notice: Subject to any disclaimer, the term of this patent is extended or adjusted under 35 U.S.C. 154(b) by 953 days.

(21) Appl. No.: 11/860,040

(22) Filed: Sep. 24, 2007

(65) Prior Publication Data

US 2009/0080695 A1    Mar. 26, 2009

(51) Int. Cl.
  *H04N 5/262* (2006.01)
(52) U.S. Cl. .................... 348/240.3; 348/262
(58) Field of Classification Search .......... 348/240.3
  See application file for complete search history.

(56) References Cited

U.S. PATENT DOCUMENTS

| | | | | |
|---|---|---|---|---|
| 5,262,871 A | * | 11/1993 | Wilder et al. | 348/307 |
| 5,880,777 A | * | 3/1999 | Savoye et al. | 348/217.1 |
| 5,909,244 A | * | 6/1999 | Waxman et al. | 348/222.1 |
| 6,489,992 B2 | * | 12/2002 | Savoye | 348/340 |
| 6,512,218 B1 | * | 1/2003 | Canini et al. | 250/208.1 |
| 7,551,203 B2 | * | 6/2009 | Nakayama et al. | 348/222.1 |
| 2001/0019361 A1 | * | 9/2001 | Savoye | 348/222 |
| 2009/0080695 A1 | * | 3/2009 | Yang | 382/103 |

* cited by examiner

*Primary Examiner* — Sath V Perungavoor (57) ABSTRACT

Conventional electro-optical imaging systems can not achieve wide field of view (FOV) and high spatial resolution imaging simultaneously due to format size limitations of image sensor arrays. To implement wide field of regard imaging with high resolution, mechanical scanning mechanisms are typically used. Still, sensor data processing and communication speed is constrained due to large amount of data if large format image sensor arrays are used. This invention describes an electro-optical imaging system that achieves wide FOV global imaging for suspect object detection and local high resolution for object recognition and tracking. It mimics foveated imaging property of human eyes. There is no mechanical scanning for changing the region of interest (ROI). Two relatively small format image sensor arrays are used to respectively acquire global low resolution image and local high resolution image. The ROI is detected and located by analysis of the global image. A lens array along with an electronically addressed switch array and a magnification lens is used to pick out and magnify the local image. The global image and local image are processed by the processor, and can be fused for display. Three embodiments of the invention are described.

33 Claims, 6 Drawing Sheets

Schematic diagram of one embodiment of the presented system.

Figure 1

Schematic diagram of one embodiment of the presented system.

Figure 2

Coaxial lens array imaging principle.

Figure 3

An example of reconfigurable image with a high-resolution window.

Figure 4

Two portions respectively display global and local images

Figure 5

Schematic of system architecture of another embodiment of the presented invention.

Figure 6

Schematic of system architecture of another embodiment of the presented invention.

ELECTRO-OPTICAL FOVEATED IMAGING AND TRACKING SYSTEM

FIELD OF THE INVENTION

The present invention relates to optical imaging and tracking systems and more particularly to an optical imaging architecture that mimics bio-vision to achieve panoramic monitoring for situation awareness and local high spatial resolution for revealing object details.

BACKGROUND OF THE INVENTION

There are varieties of electro-optical (E/O) imaging systems used in commercial and military fields for reconnaissance and surveillance. For optimal status awareness and target discrimination, images acquired using various imaging detectors with sufficient target details and wide field of view (FOV) are necessary.

Similar to the human eye, an E/O imaging system also consists of optical imaging lens, photo sensing array and image receiving and processing unit. Optical imaging lenses of both human eye and E/O imaging system could have very powerful resolution capability; however, the later has much poorer overall performance. The basic reason is that the human eye has foveated imaging feature, which has a high resolution central foveal region. Surrounding this region, gradually reduced resolution extends to a wide FOV for each eye [Ref 1: C. Curcio, K. Sloan, O packer, A. Hendrickson, R. Kalina, "Distribution of cones in human and monkey retina: individual variability and radial asymmetry." Science 236, 579-582 (1987)]. The eye gazes at the region of interest (ROI) and images ROI on foveal region to achieve highest resolution while remains awareness at surroundings with lower resolution. Furthermore, the eyeball is capable of rotating rapidly about its center to reposition its fovea. The brain then integrates over time the information entering the small but very agile high resolution-density foveal region to create the subjective impression of a uniform-density wide FOV high resolution image.

Contrastively, a conventional E/O imaging system has uniform density pixel on entire sensing region. To image a wide FOV scene, it would be necessary to combine vast amount of individual images into a giant mosaic due to the limited format size of a conventional imaging detector device. There is a trade-off between the achievable viewing angle and the resolving ability, i.e. wide FOV results in coarse resolution and vice versa.

Practical applications require both wide FOV and high resolution of an E/O imaging sensor. For example, surveillance and tracking in urban warfare or in civilian commercial security, two basic functions are necessary. The first is the detection of the potential existence of a specific object within a wide area. The second function is to identify and track or point the object with high accuracy. In the event of multiple objects, the number of targets needs to be counted and tracked at substantially the same time.

Based-on the available pixel limited detector array, some wide FOV and high resolution imaging sensors have been developed. It has been reported that target tracking system uses two independent optical imaging systems to respectively acquire global coarse scene and local fine interest area [Ref: 2: J. M. Denney, E. L. Upton, "Missile surveillance method and apparatus," U.S. Pat. No. 5,300,780]. Once a target is detected in the coarse image, a control signal is sent to the fine optical imaging system to set it pointing to the interested direction. Its advantage is that using two detector arrays of moderate resolution can acquire scene in interested area with high resolution. The shortcomings are that the adjustment of the fine imaging system is mechanical, which is subject to problems of accuracy, vibration, calibration, drift, and unwanted resonance. If there are more than one targets, either several fine imaging systems are needed or using one fine imaging system to perform sequential checking each interested local area. This results in a complex system with slow response.

With the increase in transistor density in CMOS arrays, the future sensor arrays may have much more pixel number to 100+ megapixels per sensor for acquiring high-resolution images with wide FOV. However, when these imaging arrays grow in pixel number for higher resolution, very strong onboard processing and high communication bandwidths will also be required to acquire the image and/or transmit the image data between platforms. There will be a limitation for applications in small payload platforms that require low cost, compact packaging and low power consumption.

Based on above discussions, there are mainly two constraints in realization of high resolution, large coverage and fast frame rate imaging sensor, which are sensor pixel numbers and data link bandwidth. This situation implies a demand to develop innovative sensor architecture, based on available imaging sensor format size, that can achieve simultaneously wide FOV monitoring with low resolution and local high resolution for object discrimination.

OBJECTS OF THE INVENTION

It is therefore an object of the present invention to provide an E/O imaging sensor that has wide field-of-view for global situation awareness and high spatial resolution at region of interest for object detection and discrimination.

It is another object of the present invention to reduce data communication bandwidth between photo electronic chip and on board processor and between sensor platform and remote control station.

It is yet another object of the present invention to provide a foveated imaging sensor with non-moving fully solid-state opto-electronic components based on available format-size-limited detector arrays.

SUMMARY OF THE INVENTION

According to the present invention, there is described a novel electro-optical imaging system that can achieve wide field of view (FOV) global imaging for suspect object detection and local high resolution for object recognition and tracking. It mimics foveated imaging property of human eyes. There is no mechanical scanning for changing region of interest (ROI). Two relatively small format image detector arrays are used to respectively acquire global low resolution image and local high resolution image. The ROI is detected and located by analysis of the global image. A lens array along with an electronically addressed switch array and a magnification lens is used to pick out and magnify the local image. The global image and local image are processed by the processor, and can be fused for display. Three embodiments of the invention are descried. In one embodiment, a primary imaging lens acquires the wide FOV scene of specified waveband and projects the image onto the write-in side of an image transfer device which makes a copy of the write-in image on its read-out side. Using a collimated narrowband white light to read out the image, two copies of the image are then generated by proper optics. One copy is acquired by a detector array and used as the global image. The other copy is presented to the local image magnification subsystem for local magnification of the selected ROI. The magnified local image is acquired by another image detector. In another embodiment, the acquired wide FOV image by the primary camera lens is directly split into two copies by a beam splitter. The two copies, one is used as the global image and the other is used to present to the local image magnification subsystem. In another embodiment, the acquired wide FOV image by the primary camera lens is projected to a micro-mirrors array device. The micro-mirrors array device can alternatively redirect the whole image or any portion on its surface to two channels. The global image is firstly redirected to the global imaging channel, acquired, and further analyzed to detect the ROI. The ROI location information is then sent to the micro-mirrors array device to just redirect the ROI area to the local image magnification channel for further magnification.

DETAILED DESCRIPTION

Figure 1:
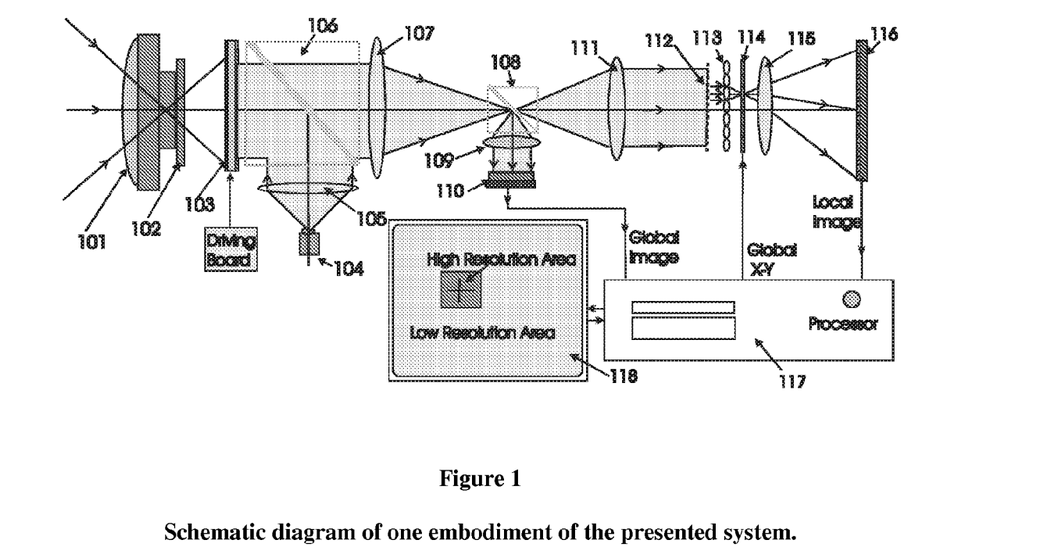
FIG. 1 is a schematic diagram of one embodiment of the proposed foveated imaging and tracking system.

This invention presents a new sensor system with reconfigurable zooming ability similar to mimic foveal vision of the eye to acquire wide FOV global scene and high-resolution on interest local regions. FIG. 1 is a schematic diagram of one embodiment of the presented foveated imaging and tracking system. It consists of four main portions: (1) wide FOV imaging foreoptics; (2) global coarse image acquisition subsystem; (3) local high resolution images generation and acquisition subsystem, and (4) image processing and accurate target locating subsystem.

The remote scene is imaged by a wide FOV camera lens 101 designed for the desired wavelength band. For example, for imaging and tracking hot objects, an IR camera lens can be adopted. A proper optical filter 102 is used to transmit wanted spectral band and reflect/eliminate unwanted spectral band. By proper optical imaging system design, a high-resolution image will be presented at the write-in surface of an optically addressed spatial light modulator, e.g., a liquid crystal light valve (LCLV) device 103.

LCLVs are not pixelated and their spatial resolution depends on the resolution of the conductive layer material. For example, different versions of the Hughes single crystal silicon liquid crystal light valve (Si-LCLV) have been used as large screen display devices [Ref 3: R. W. Hellwarth and G. Martin, "Infrared-To-Optical Image Conversion by Bragg Reflection From Thermally Induced Index Gratings," Appl. Phys. Lett., 34, 371-373 (1979).], IR dynamic image converters [Ref 4: J. Reintjes, *Nonlinear Optical Parametric Processes in Liquids and Gases* (Academic, Orlando) 1984, Chap. 5-6] and optical data processing devices [Ref 5: I. C. Khoo and R. Normandin, "Infrared to visible image conversion capability of a nematic liquid crystal film," Appl. Phys. Lett. 47, 350 (1985).]. A IR-to-visible image converter using a Hughes silicon LCLV has been reported [Ref 6: U. Efron, J. Grinberg, P. O. Braatz, M. J. Little, P. G. Reif, and R. N. Schwartz, "The silicon liquid-crystal light valve," J. Appl. Phys. 57(4), 1356-1368 (1985)]. This device exhibits several attractive features: high sensitivity in IR, high resolution, broad bandwidth for both writing and readout beams, coherent- (incoherent-) to-coherent (incoherent) conversion, up and down wavelength conversion, high damage threshold, and real-time operation at room temperature.

For this application, the LCLV device copies the image on its input surface to its output surface with some variations. It transfers the input large divergence angle image of visible or infrared into on-axis visible or near IR image depending on the applied readout light source so that low cost visible optical components and Si-based imaging sensor arrays (CCDs or CMOS cameras) can be used in the rest of this system. Since this transfer process is optically addressed, there is no digitization and data communication, whose transfer speed is solely determined by the response of the photoconductive material and independent to the image dimension, which results in very faster transfer speed.

The LCLV output plane is readout using a collimated visible light beam with proper intensity, which is introduced by a spot white light source 104 and collimating lens 105 through beam splitter 106. The white light source 104 may be filtered to achieve narrower band for reducing chromatic aberration of thereafter subsystems and for maximizing performance of thereafter liquid crystal devices. Due to high light sensitivity of imaging sensor array, the light source is not necessary high intensity like those used in a projection system for large area vision display. Following, there are two image relay optical paths separated by a beam splitter 108 locating at the focal plane of a common front lens 107 of the two paths. By selecting different focal lengths of rear lenses 109 and 111 of the two relay paths, the sizes of the two relayed images can be controlled to respectively fit the sizes of imaging sensor array 110 and lens array (LA) 113. The two relayed images are then used as global surveillance and target positioning.

The global image on imaging sensor array 110 plane can be acquired with relatively small format size (e.g. 256×256) for higher image acquisition speed. The generated global coarse image (low resolution) is analyzed by processor 117 to detect the potential existence of interested target. Due to relatively small format of the global image, the process can be completed quickly with advanced automatic target detection (ATD) programs. The global image can also be monitored by human eye and the ROI location can be determined manually. The location information of the interested target is automatically used to switch ON the corresponding local high-resolution images in the other path.

The other optical path is used to achieve higher resolution of ROI and fine position of the detected target. The LA 113 is located behind the delayed image plane 112 with distance of one focal length of the sub-lens. Behind the lens array 113, one electronically addressed spatial light modulator 114 with same pixel size and arrangement of the LA 113 is inserted. Various spatial light modulators for this application are commercially available, e.g. a liquid crystal spatial light modulator, we call it as liquid crystal switcher array (LCSA). By switching ON one unit of the LCSA 114, the corresponding sub-region of the relayed image 112 will be enlarged onto the imaging sensor array 116 via the combination of one sub-lens with the magnification lens (ML) 115. The imaging sensor array 116 can also be a relatively small format sensor (e.g. 256×256).

Figure 2:
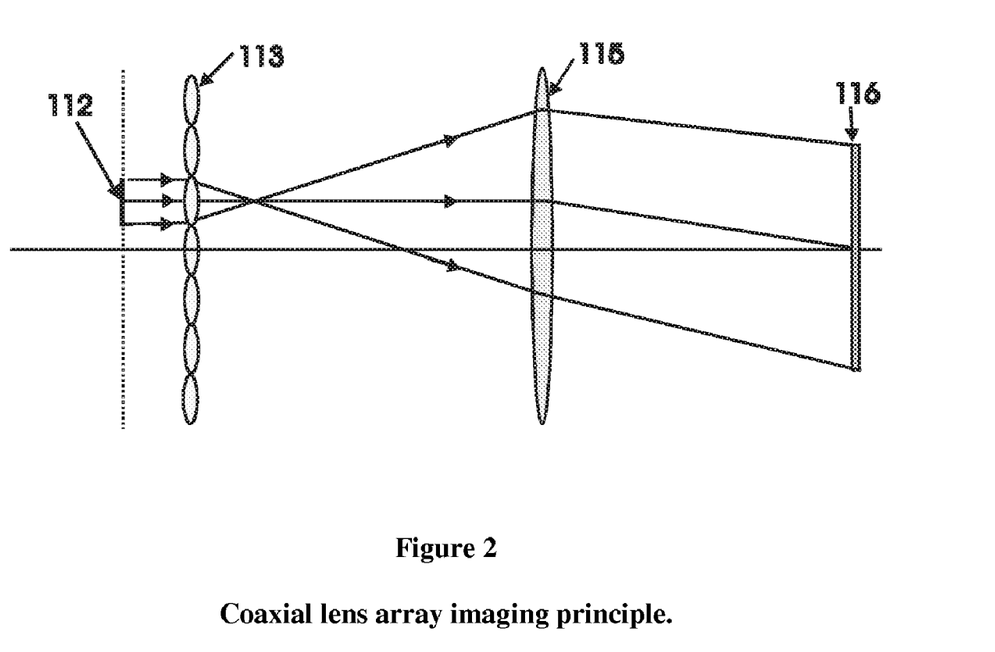
FIG. 2 is a schematic of coaxial lens array imaging principle.

The control signal for switching ON one designated pixel of the LCSA 114 is coming from the location information obtained by analyzing global image on the imaging sensor array 110. The imaging sensor array 116 is locating at the back focal plane of the ML 115. It can be proved that any image sub-region 112 can be imaged at the exactly same location on the imaging sensor array 116 by geometrical optics based on a coaxial architecture of the combination of a LA 113 and a ML 115 as shown in FIG. 2. This architecture has been successfully applied in a large-scale optical neural network processor for free space interconnection [Ref. 7: S. Gao, Y. Zhang, J. Yang, and G. Mu, "Coaxial architecture of an optical neural network with a lenslet array," Opt. Lett. 19, 2155-2157 (1994).]

Figure 3:
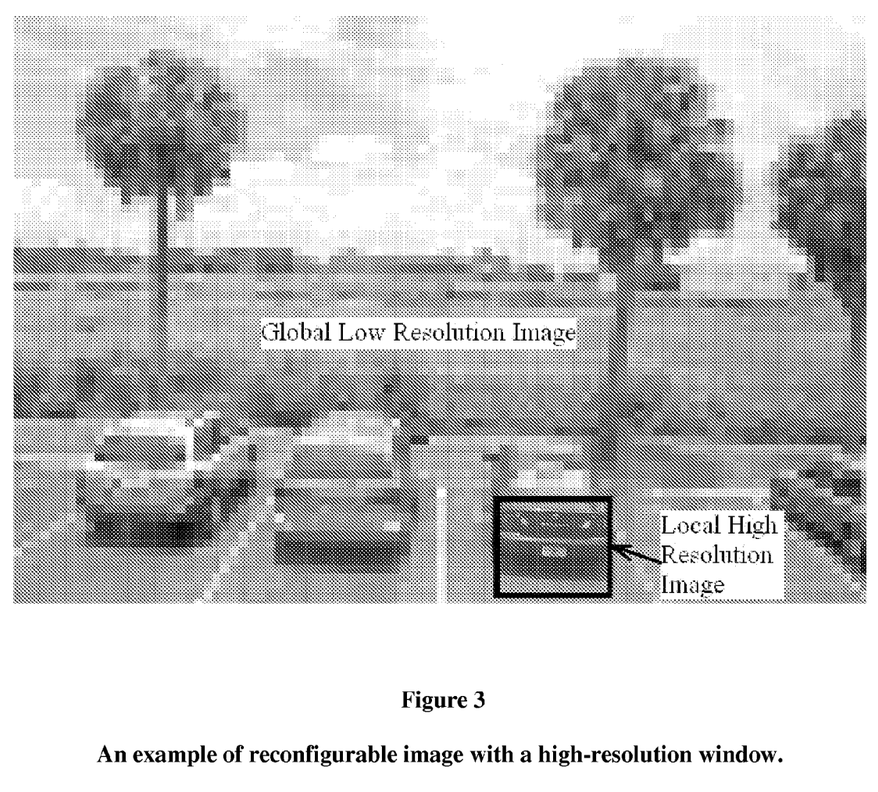
FIG. 3 is an example of reconfigurable image with a high-resolution window.
Figure 4:
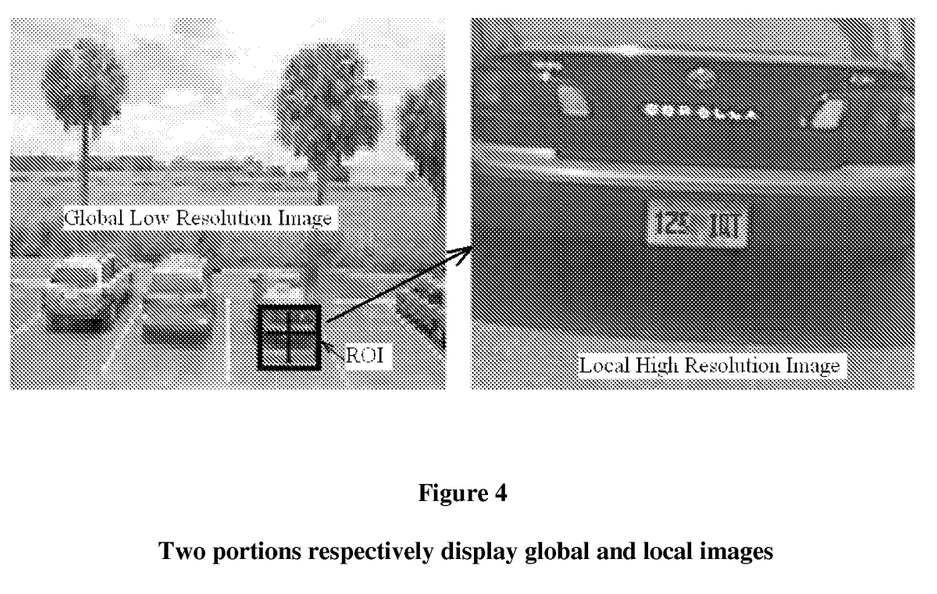
FIG. 4 is a schematic of two portions respectively display global and local images.

Both images of the imaging sensor array 110 and the imaging sensor array 116 are displayed on a display screen 118. The high-resolution image can be inserted into the low-resolution global image at its relevant location on the screen display 118. The high-resolution window is dynamically movable to its corresponding site in the scene image by simple image fusion. FIG. 3 is an example of the combined image, where the high resolution area is included in the black box. It can also divide the screen into two portions, they respectively display a low-resolution global image and a local high-resolution image and use a cross-cursor to indicate the interest area in the global image, as shown in FIG. 4.

From the above discussion, it is obvious that the amount of transferred image data is the summation of the two detector array pixels. The data transfer bottleneck problem is resolved by this approach with limited data throughput.

There is also a possibility that multiple interest targets simultaneously emerge in the FOV. In this case, each target position information can sequentially send to LCSA 114 to switch ON corresponding local image for alternatively local image acquisition. Since LCSA 114 and the imaging sensor array 116 have up to hundreds frame rate combining with high speed processing chips, the accurate position information of all targets could still be revealed in near real time.

Figure 5:
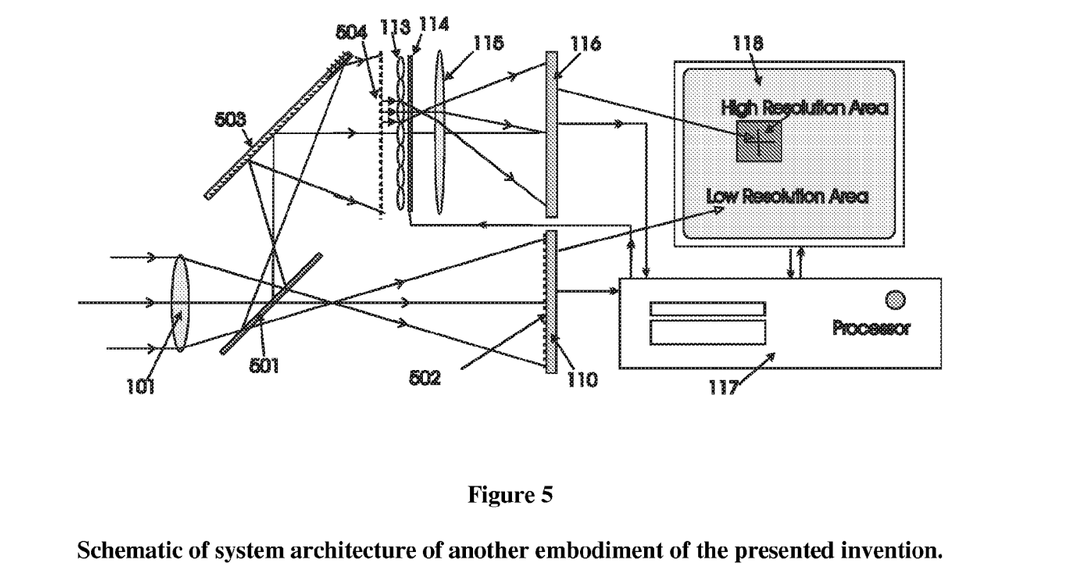
FIG. 5 shows another embodiment of the present invention.

In another embodiment as shown in FIG. 5, the remote scene is captured by a camera lens 101. By using a beam splitter 501 behind the camera lens 101, two identical images are generated on imaging planes 502 and 504 of the two branches. The images resolution is totally determined by the optical quality of the camera lens 101. High-resolution images can always be achieved if proper camera lens is applied. In the lower branch, the high-resolution image is detected by using a low-resolution imaging sensor array 110 with relative large pixel size. Each pixel will average the illumination on its sensing area. This global image is then acquired into the processor 117 (e.g. PC) and displayed on screen 118. The beam splitter 501 reflects one portion of the global image to the upper branch (folded by mirror 503) at image plane 504, which is located in the front focal plane of the lens array 113. The principle for local magnification and image fusion and target locating are same as described in the first embodiment.

Figure 6:
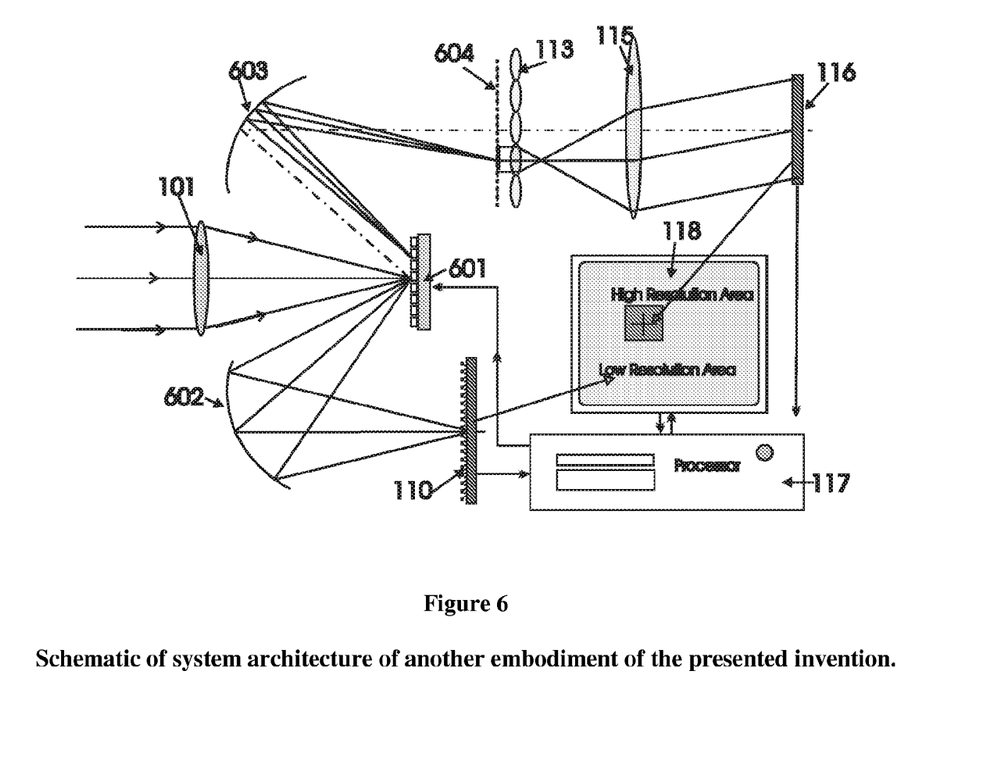
FIG. 6 shows another embodiment of the present invention.

In another embodiment as shown in FIG. 6, an image of the scene is presented to the two-dimensional digital micro-mirrors device (DMD) 601 through the camera lens 101. The DMD 601 consists of an array of micromirrors. Each mirror is mounted on a post, and can tilt along the diagonal direction with fixed rotation angles relative to the substrate. The DMD redirects the image to the two optical channels corresponding to the mirror's two states. Also, any desired ratio of light energy from any given pixel can be assigned to a specific channel by rapid time modulation of the micromirror's position within a sensor's integration time. We note here that, unlike DMD applied to projectors that the projected image spatial resolution is limited by the DMD's pixel number since the DMD is illuminated by a uniform source, this application can result in higher resolution images (compared to DMD format size) to the two channels since the ON/OFF states of the DMD functions like a flat mirror due to ignorable spacing between pixels.

Assume the image redirected to the global imaging channel (lower channel) corresponds to DMD's ON state. Using an aspherical mirror 602, the global image is relayed to and acquired by the imaging sensor array 110, and is analyzed to detect the existence of ROI and determine ROI coarse position either automatically or manually. The coarse location information of the ROI is then automatically sent to the DMD driver to redirect the ROI to the other channel for local high-resolution image generation. The redirected area is relayed by the aspherical mirror 603 to the front focal plane 604 of a corresponding lenslet of the lens array 113. Through registration calibration, each reflected ROI matches a specified sub-lens of the lens array. The principle for local magnification and image fusion and target locating are same as described in the first embodiment.

REFERENCES

1. C. Curcio, K. Sloan, O packer, A. Hendrickson, R. Kalina, "Distribution of cones in human and monkey retina: individual variability and radial asymmetry." Science 236, 579-582 (1987).
2. J. M. Denney, E. L. Upton, "Missile surveillance method and apparatus," U.S. Pat. No. 5,300,780.
3. R. W. Hellwarth and G. Martin, "Infrared-To-Optical Image Conversion by Bragg Reflection from Thermally Induced Index Gratings," Appl. Phys. Lett., 34, 371-373 (1979).
4. J. Reintjes, *Nonlinear Optical Parametric Processes in Liquids and Gases* (Academic, Orlando) 1984, Chap. 5-6.
5. I. C. Khoo and R. Normandin, "Infrared to visible image conversion capability of a nematic liquid crystal film," Appl. Phys. Lett. 47, 350 (1985).
6. U. Efron, J. Grinberg, P. O. Braatz, M. J. Little, P. G. Reif, and R. N. Schwartz, "The silicon liquid-crystal light valve," J. Appl. Phys. 57(4), 1356-1368 (1985).
7. S. Gao, Y. Zhang, J. Yang, and G. Mu, "Coaxial architecture of an optical neural network with a lenslet array," Opt. Lett. 19, 2155-2157 (1994).

What is claimed is:

1. An electro-optical foveated imaging and tracking system comprising:
   a lens;
   an image transfer device configured to receive an image from the lens;
   a readout of the image transfer device using a collimated visible light beam;
   a device configured to generate two image relay channels using the readout;
   a first image detection device with an image magnifying subsystem configured to receive one of the two image relay channels;
   a second image detection device configured to receive the other one of the two image relay channels;
   a switcher array configured to transmit a sub-region of one of the two image relay channels onto the first image detection device; and
   a processor configured to receive data from the first and second image detection devices and perform processing.

2. The electro-optical foveated imaging and tracking system according to claim 1, wherein the lens includes at least one of refractive or reflective components.

3. The electro-optical foveated imaging and tracking system according to claim 1, wherein a scene is imaged at a designated waveband; and wherein the image transfer device makes a visible copy for readout.

4. The electro-optical foveated imaging and tracking system according to claim 1, wherein the collimated visible light beam is generated using at least a spot white light source, a collimation lens and a beam splitter.

5. The electro-optical foveated imaging and tracking system according to claim 1, further comprising an optical configuration with the lens being common and a beam splitter located at focal plane to generate the two image relay channels.

6. The electro-optical foveated imaging and tracking system according to claim 1, wherein the magnifying subsystem includes at least one of a lens array and a magnification lens.

7. The electro-optical foveated imaging and tracking system according to claim 1, wherein the switcher array is addressable by an electronic signal to open a specified unit that is relevant to a region of interest (ROI) location.

8. The electro-optical foveated imaging and tracking system according to claim 1, wherein the first image detection device is located on a back focal plane of a magnification lens in order to acquire a local magnified image and the second image detection device is located at a relayed image location in order to acquire the global image.

9. The electro-optical foveated imaging and tracking system according to claim 8, wherein the global image is analyzed and processed by the processor and a region of interest (ROI) in the global scene is determined by the processor or by direct human eye monitoring.

10. The electro-optical foveated imaging and tracking system according to claim 9, wherein a location information of region of interest (ROI) is sent to the switcher array to open a corresponding unit.

11. The electro-optical foveated imaging and tracking system according to claim 1, wherein the processor further includes a computing system with programs to perform at least one of image processing and automatic target detection.

12. The electro-optical foveated imaging and tracking system according to claim 1, further comprising a display configured to display an acquired global image and local image and a operator interface configured for pointing to a region of interest on the global image.

13. An electro-optical foveated imaging and tracking system comprising:
   a lens;
   an image splitting device to split the image obtained from the lens into two image relay channels;
   a first image detection device with an image magnifying subsystem configured to receive one of the two image relay channels;
   a second image detection device configured to receive the other one of the two image relay channels;
   a switcher array configured to transmit a sub-region of one of the two image relay channels onto the first image detection device; and
   a processor configured to receive data from the first and second image detection devices and perform processing.

14. The electro-optical foveated imaging and tracking system according to claim 13, wherein the lens includes at least one of refractive or reflective components.

15. The electro-optical foveated imaging and tracking system according to claim 13, wherein the two image relay channels comprises one channel for global imaging and the other for local magnification.

16. The electro-optical foveated imaging and tracking system according to claim 13, wherein the magnifying subsystem includes at least one of a lens array and a magnification lens.

17. The electro-optical foveated imaging and tracking system according to claim 13, wherein the switcher array is addressable by an electronic signal to open a specified unit that is relevant to a region of interest (ROI) location.

18. The electro-optical foveated imaging and tracking system according to claim 13, wherein the first image detection device is located on a back focal plane of a magnification lens in order to acquire a local magnified image and the second image detection device is located at a location of a transmitted image of the image splitting device in order to acquire the global image.

19. The electro-optical foveated imaging and tracking system according to claim 18, wherein the global image is analyzed and processed by the processor and a region of interest (ROI) in the global scene is determined by the processor or by direct human eye monitoring.

20. The electro-optical foveated imaging and tracking system according to claim 19, wherein a location information of region of interest (ROI) is sent to the switcher array to open a corresponding unit.

21. The electro-optical foveated imaging and tracking system according to claim 13, wherein the processor further includes a computing system with programs to perform at least one of image processing and automatic target detection.

22. The electro-optical foveated imaging and tracking system according to claim 13, further comprising a display configured to display an acquired global image and local image and operator interface configured for pointing to a region of interest on the global image.

23. An electro-optical foveated imaging and tracking system comprising:
   a lens;
   a micro-mirrors array device configured to receive an image from the lens and output two image relay channels;
   a first image detection device with an image magnifying subsystem configured to receive one of the two image relay channels;
   a second image detection device configured to receive the other one of the two image relay channels;
   a switcher array configured to transmit a sub-region of one of the two image relay channels onto the first image detection device; and
   a processor configured to receive data from the first and second image detection devices and perform processing.

24. The electro-optical foveated imaging and tracking system according to claim 23, wherein the lens includes at least one of refractive or reflective components.

25. The electro-optical foveated imaging and tracking system according to claim 23, wherein the micro-mirrors array device selects and redirects the selected portion of an image acquired by the lens as the two image relay channels, with one channel being for global imaging and the other channel being for local magnification.

26. The electro-optical foveated imaging and tracking system according to claim 23, further comprising at least one of an aspherical mirror and refractive lens to relay the selected portion of the image on the micro-mirrors array device.

27. The electro-optical foveated imaging and tracking system according to claim 23, wherein the magnifying subsystem includes at least one of a lens array and a magnification lens.

28. The electro-optical foveated imaging and tracking system according to claim 23, wherein the switcher array is addressable by an electronic signal to open a specified unit that is relevant to a region of interest (ROI) location.

29. The electro-optical foveated imaging and tracking system according to claim 23, wherein the first image detection device is located on a back focal plane of the magnification lens in order to acquire a local magnified image and the second image detection device is located at a relayed image location in order to acquire the global image.

30. The electro-optical foveated imaging and tracking system according to claim 29, wherein the global image is analyzed and processed by the processor and a region of interest (ROI) in the global scene is determined by the processor or by direct human eye monitoring.

31. The electro-optical foveated imaging and tracking system according to claim 30, wherein a location information of region of interest (ROI) is sent to the switcher array to open a corresponding unit.

32. The electro-optical foveated imaging and tracking system according to claim 23, wherein the processor further includes a computing system with programs to perform at least one of image processing and automatic target detection.

33. The electro-optical foveated imaging and tracking system according to claim 23, further comprising a display configured to display an acquired global image and local image and operator interface configured for pointing to the region of interest on the global image.

* * * * *